United States Patent [19]
Rasko et al.

[11] Patent Number: 5,425,825
[45] Date of Patent: Jun. 20, 1995

[54] RECLOSABLE ZIPPER WITH TAMPER EVIDENT FEATURE

[76] Inventors: George Rasko, 15-30 Everett Ter., Fairlwan, N.J. 07410; Lawrence Share, 8040 Kenneth Ave., Skokie, Ill. 60076

[21] Appl. No.: 51,612

[22] Filed: Apr. 22, 1993

[51] Int. Cl.6 .......... B31B 1/90; B32B 31/12; B32B 31/20; B65D 33/16
[52] U.S. Cl. .......... 156/66; 24/400; 156/82; 156/244.18; 156/260; 156/272.6; 383/61; 383/63; 383/211; 493/213; 493/214
[58] Field of Search .......... 383/61, 63, 211; 24/399–400, 576, 587; 493/213–214; 156/272.6, 260, 272.2, 275.3, 244.23, 244.25, 244.27, 244.18, 82, 66

[56] References Cited
U.S. PATENT DOCUMENTS

| | | | |
|---|---|---|---|
| 3,986,914 | 10/1976 | Howard | 156/66 X |
| 4,540,537 | 9/1985 | Kamp | 156/66 X |
| 4,947,525 | 8/1990 | Van Erden | 156/66 X |
| 4,966,470 | 10/1990 | Thompson et al. | 383/61 |
| 5,224,779 | 7/1993 | Thompson et al. | 383/61 X |
| 5,238,306 | 8/1993 | Heintz et al. | 383/61 |

*Primary Examiner*—Adrienne Johnstone

[57] ABSTRACT

A plastic bag having a reclosable plastic zipper is provided with a tamper-evident, non-reclosable peel seal formed by applying an adhesive to a treated strip adjacent to the interlocking zipper. The treatment is preferably by corona discharge, which causes the adhesive used to provide the peel seal to preferentially adhere to the treated strip when the peel seal is broken. A method for manufacturing the reclosable plastic zipper includes the steps of extruding a zipper profile, treating a portion of its surface, preferably by corona discharge, applying an adhesive to the treated portion, slitting the profile lengthwise, and folding over one of the resulting sides of the zipper to interlock them with one another.

26 Claims, 7 Drawing Sheets

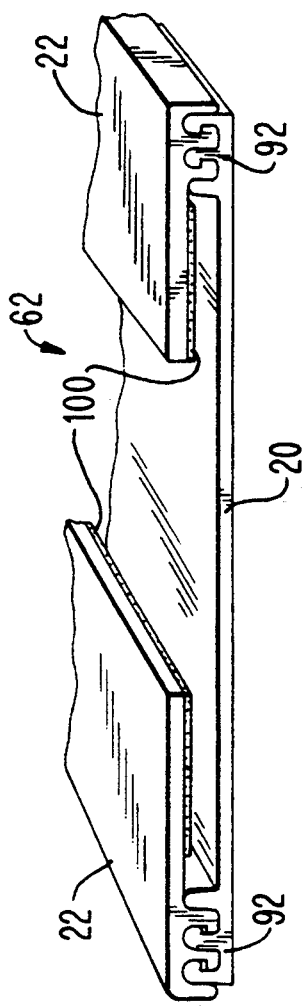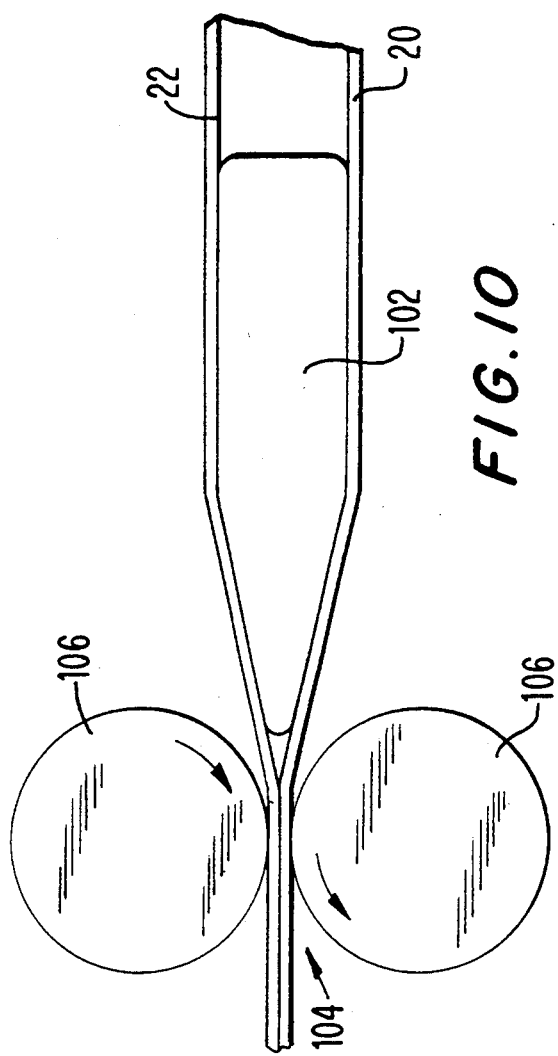

RECLOSABLE ZIPPER WITH TAMPER EVIDENT FEATURE

BACKGROUND OF THE INVENTION

1. Field of the Invention

This relates in general to the packaging art, and more particularly is concerned with a continuous reclosable plastic zipper of a type which is used to close the mouth of a bag or package, and which includes, either before or after the zipper relative to the mouth of the bag or package, a tamper-evident non-reclosable peel-seal feature.

2. Description of the Prior Art

In the use of plastic bags and packages, particularly for foodstuffs, it is important that the bag be hermetically sealed until the purchaser acquires the bag and its contents, takes them home, and opens the bag or package for the first time. It is then commercially attractive and useful for the consumer that the bag or package be reclosable so that its contents may be protected. Flexible plastic zippers have proven to be excellent for reclosable bags, because they may be manufactured with high-speed equipment and are reliable for repeated reuse. A typical zipper is one which has a groove at one side of the bag mouth and a rib at the other side, which rib may interlock into the groove when the sides of the mouth of the bag are pressed together. Alternatively, a member having a plurality of ribs may be on one side of the bag mouth, while a member having a plurality of channels may be on the other side, the ribs locking into the channels when the sides of the mouth of the bag are pressed together. In such a case, there may be no difference in appearance between the two members, as the ribs may simply be the intervals between channels on a strip which may lock into another of the same kind. In general, and in short, some form of male/female inter-engagement is used to join the two sides of the bag mouth together. The so-called members, or strips, are bonded in some manner to the material from which the bags themselves are manufactured.

Usually, pull flanges extend above the rib and groove strips, which pull flanges may be pulled apart for access to the interior of the bag.

Although flexible zippers of this variety are quite popular, they do not always prevent the inadvertent or unwelcome opening of a bag or package within the store, and various additions have been made to provide tamper-evident seals which would reveal when it has been opened prior to purchase.

It is clear then that, in spite of the fairly high state of development in this art, there are certain objectives which have not been fully met. In particular, tamper-evident non-reclosable peel seals in plastic bags of the prior art remain characterized by highly inconsistent opening forces. That is to say, the development of a tamper-evident non-reclosable peel seal requiring a reproducibly consistent opening force, large enough to obviate accidental or unintended opening, yet small enough that the bag itself may not be damaged during separation of the peel seal, has to date eluded those skilled in the art. At the same time, the requirement that the adhesive used to form the peel seal remain on only one side of the bag, without the formation of adhesive filaments across the bag opening, and not readhere when the bag is closed, has not been satisfied in the bags of the prior art.

It is accordingly an object of the present invention to provide an improved tamper-evident non-reclosable peel seal suitable for use with reclosable plastic zippers in plastic bags and other packages to provide a hermetic seal until the peel seal is opened for the first time, and to provide a peel seal which is non-reclosable after being opened.

SUMMARY OF THE INVENTION

The present invention may be summarized as follows. In a process by which reclosable plastic bags and packages are assembled, a strip-like area adjacent and parallel to one of the two interlocking rib or groove members which reclosably seal the plastic bag or package is continuously given a treatment, for example, a corona discharge treatment, to cause an adhesive to preferentially adhere to the treated area. The adhesive, which is applied to the treated area to form the peel seal, is retained on the treated area, rather than on the opposed interlocking rib or groove member not so treated, when the peel seal is broken for the first time. Thereafter, the peel seal remains broken, as the adhesive does not have an affinity for the untreated plastic of the opposite rib or groove member once it has been separated therefrom.

The present invention will now be described in more complete detail with reference being made to the figures identified below.

BRIEF DESCRIPTION OF THE DRAWINGS

FIG. 9 shows the appearance of the profile at the conclusion of the manufacturing process.

FIG. 10 illustrates the means by which separated components of the profile are joined to one another.

DETAILED DESCRIPTION OF THE PREFERRED EMBODIMENT

Figure 1:
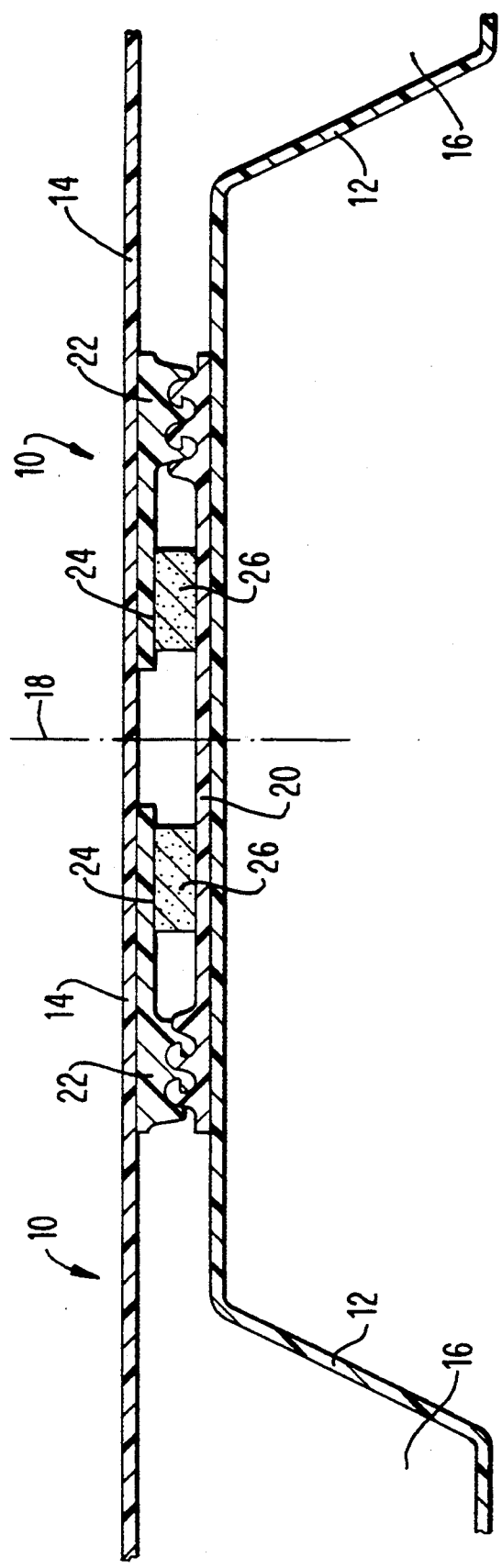
FIG. 1 is a schematic cross-sectional view of a portion of two reclosable plastic packages which include a tamper-evident non-reclosable peel seal provided in accordance with the present invention.

Referring to FIG. 1, a schematic cross-sectional view of a portion of two reclosable plastic packages is shown. The packages 10 comprise a common lower plastic sheet 12 of lightweight plastic material, such as of polyethylene, and a common upper plastic sheet 14, which may be of similar material. The lower sheet 12 may be thermoformed to produce compartments 16 in which a product may be carried. At a suitable point in the package manufacturing and filling process, the packages 10 may be separated from one another by cutting at the point indicated by dashed line 18.

When such a cut has been made, the open end, or mouth, of each package 10 has interlockable rib and groove members, which, in the embodiment shown, may be referred to as the long web 20 and the short webs 22. The so-called long web 20 has two such interlockable rib and groove members on its opposed edges; the short webs 22 have but one. It will be evident, however, that, when the packages 10 are separated from one another by cutting as indicated by dashed line 18, the long web 20 must be cut as well.

The long web 20 and short webs 22 are, in an actual package 10, bonded to the inside of the lower sheet 12 and upper sheet 14, respectively. When the packages 10 are separated by cutting as indicated by dashed line 18, the long web 20, having been cut in half, and the short webs 22 are adjacent to the mouths of the packages 10. In such a case, the lower sheet 12 and the upper sheet 14 provides means whereby the package 10 may be opened by pulling the upper sheet 14 away from the lower sheet 12 to open the plastic zipper formed by half of the long web 20 and a short web 22 to gain access to the contents of the package 10.

The present tamper-evident, non-reclosable peel seal is provided by treating those portions 24 of the short webs 22 adjacent to the rib and groove members to cause the adhesive 26 used to form the peel seal to preferentially adhere thereto. The treating may, for example, be carried out by corona discharge treatment, which modifies the surface of the short web 22 so that the adhesive may preferentially adhere thereto. It should be observed, however, that appropriate locations on the long web 20 could be so treated instead of the short webs 22. In either case, once the chosen locations have been treated, an appropriate amount of the adhesive being used is applied thereto. Adhesive 26 may also be applied to the untreated web in addition to the treated web, but, when the peel seal is broken, all of the adhesive 26 will reside on the treated side by virtue of the adhesive-adhesive bond being greater than the bond between the adhesive and untreated web.

The so-called long web 20 and short webs 22 may be extruded from a synthetic, polymeric material, such as polyethylene. Any of the adhesives used by those skilled in the art for providing peel seals may be used in the present case. For example, Pierce and Stevens E4009D adhesive has been applied to just corona treated short webs 22 in coating weights of 2.0, 1.8 and 1.6 lbs/1000 ft, and has provided excellent peel seals at those coating weights.

Figure 2:
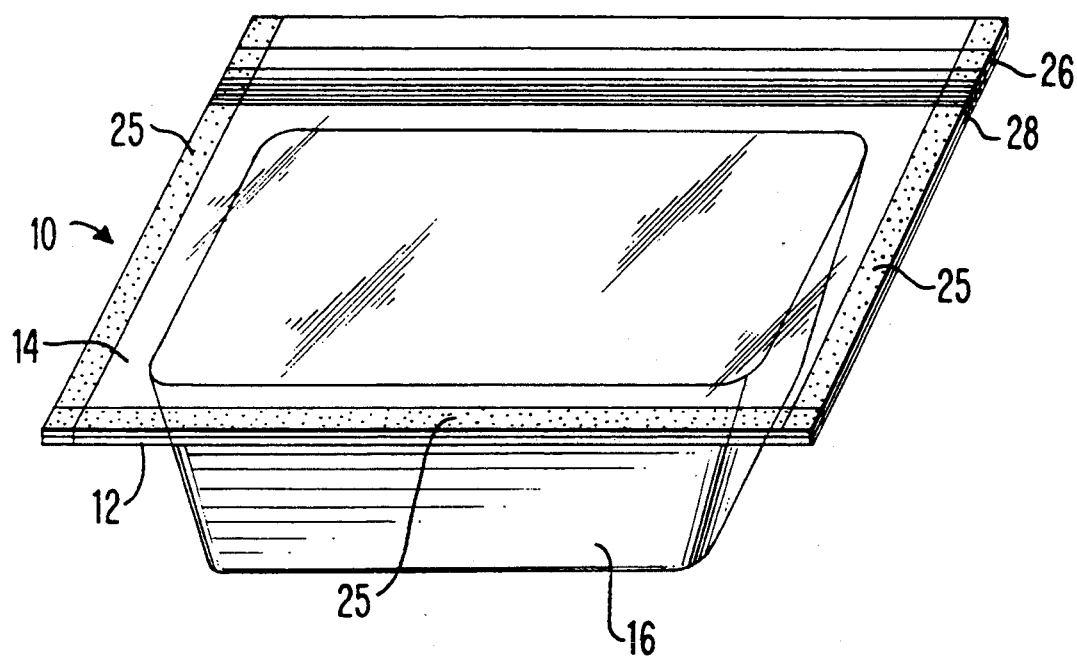
FIG. 2 is a perspective view of the package partially shown in cross section in FIG. 1.

FIG. 2 is a perspective view of the package 10 partially shown in cross section in FIG. 1. The lower plastic sheet 12 thereof is thermoformed to produce a compartment 16 for a product. The upper plastic sheet 14 is bonded or fused to the lower plastic sheet 12 on three sides of the perimeter of the package 10, as indicated by regions 25. On the fourth side, which is the farthest from a viewer of FIG. 2, the adhesive 26 provides a peel seal between the upper plastic sheet 14 and the lower plastic sheet 12. Zipper 28, formed by the interlocking rib and groove members on the long web 20 and short web 22, is inward of the adhesive 26. The peel seal provided by the adhesive 26 must be broken before access to the compartment 16 and to its contents may be gained.

Figure 3:
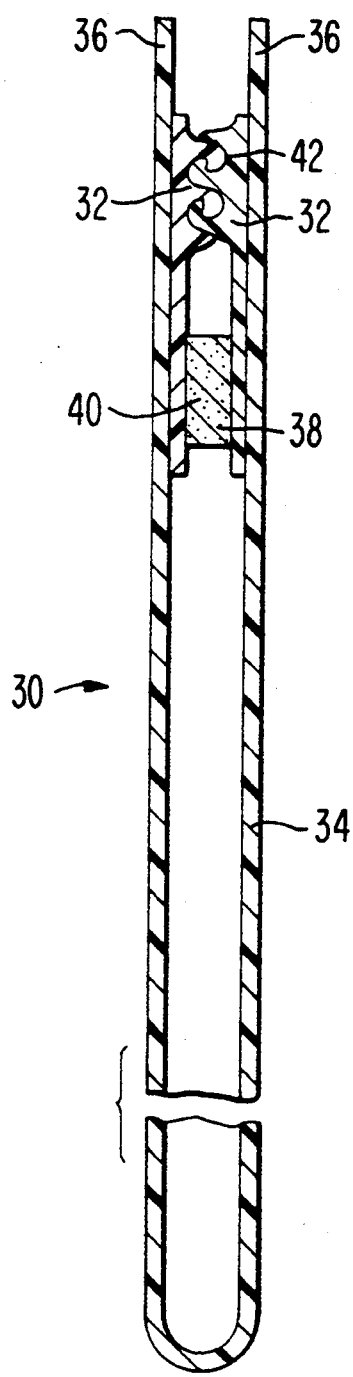
FIG. 3 is a schematic cross-sectional view of a reclosable plastic bag including the peel seal of the present invention.

FIG. 3 is a schematic cross-sectional view of a reclosable plastic bag having the peel seal of the present invention. The bag 30, shown in a sealed condition, comprises a pair of webs 32 affixed to the sheet 34 from which the bag 30 is formed. The webs 32 are affixed so as to leave flanges 36 of sheet 34 thereabove, the flanges 36 being pulled apart to open the bag 30. One of the two webs 32 is treated, such as by corona discharge treatment, to make that one web 32 more receptive to the adhesive than the other web and adhesive 38 is applied to the just treated area to form the peel seal 40. When the peel seal 40 has been broken, the adhesive 38 will reside entirely upon the treated web, and will not again adhere to the untreated web to reclose the peel seal 40. As will be noted in FIG. 3, the reclosable zipper 42 formed by the interlocking rib and groove members of the webs 32 may be closer to the mouth of the bag than the peel seal 40.

Figure 4:
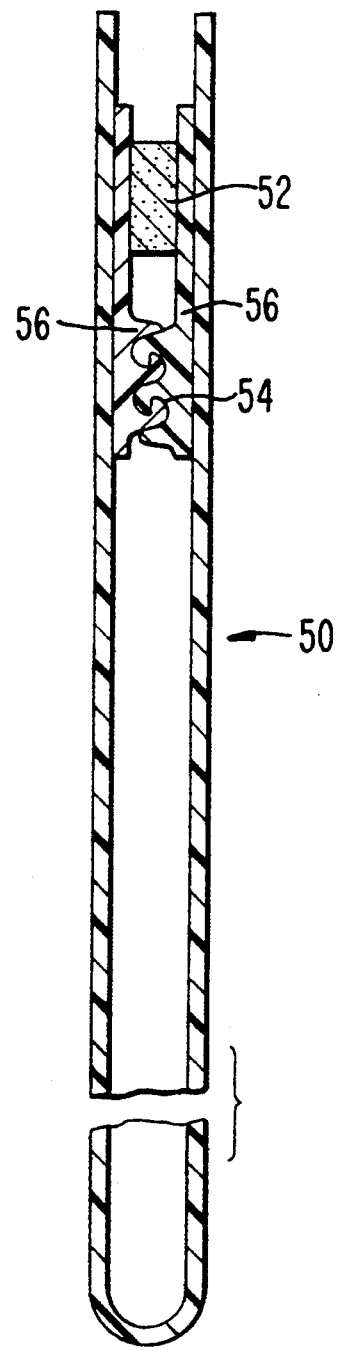
FIG. 4 is a schematic cross-sectional view of another reclosable plastic bag having the present peel seal.

FIG. 4 is a schematic, cross-sectional view of another reclosable plastic bag 50 having the present peel seal. It will be observed that bag 50 is identical to bag 30, shown in FIG. 3, except that the peel seal 52 is closer to the mouth of the bag 50 than is the reclosable zipper 54 formed by the interlocking rib and groove members on webs 56.

Figure 5:
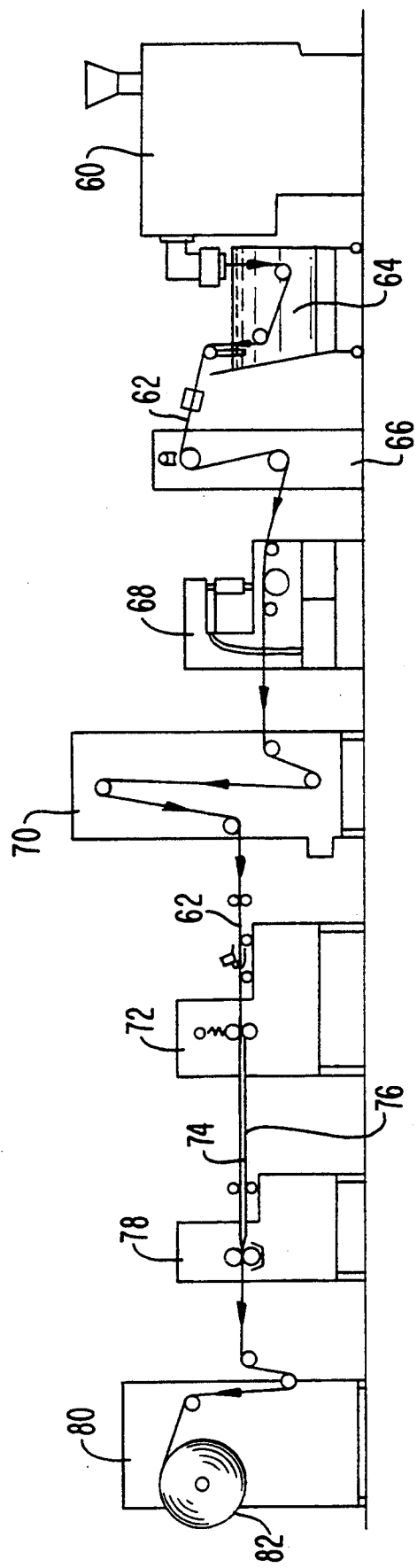
FIG. 5 is a schematic view illustrating the process by which a plastic zipper may be provided with the peel seal of the present invention.

FIG. 5 is a schematic view illustrating the process by which long webs and short webs, or profiles, such as long web 20 and short web 22 shown in FIG. 1, may be formed with the peel seal of the present invention. The process begins with an extruder 60, with which the profile 62 is extruded from a synthetic polymeric material, such as polyethylene.

The profile 62 exits from the extruder 60 into a water tank 64, which quenches and cools the newly extruded profile rapidly to a desired temperature. The profile 62 then passes through a treater 66, which may be a corona discharge treater to modify part of the surface of the profile 62 so that the adhesive may preferentially adhere thereto.

Having been so treated, the profile 62 progresses through a coater 68, and thence through a cooling tower 70. In slitter 72, the profile 62 is continually slit lengthwise into at least two components 74,76 in a manner to be illustrated below. Components 74,76 are rejoined to one another by joiner 78, and, finally, are wound onto a spool 82 by winder 80 for subsequent use in the manufacture of plastic bags or packages.

Figure 6:
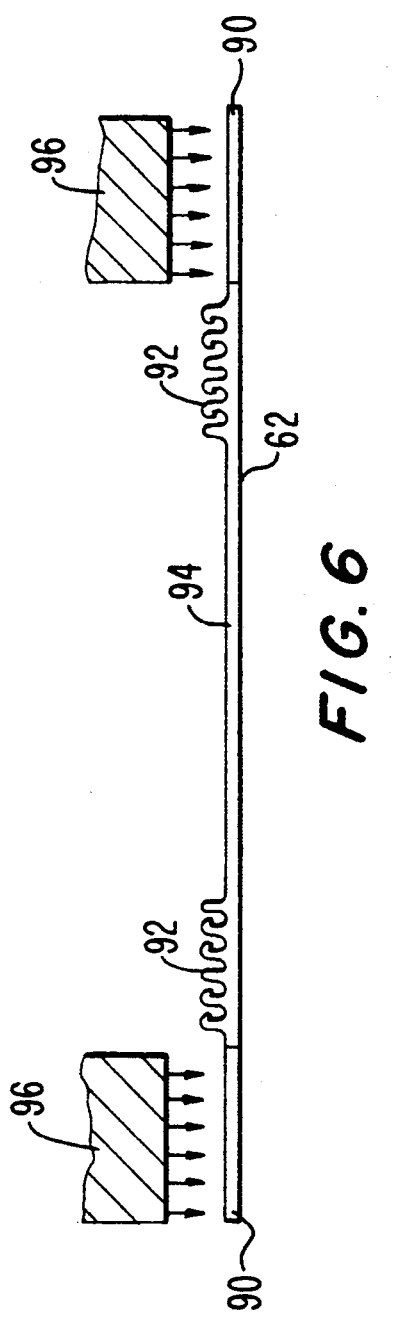
FIG. 6 is a cross section taken through the extruded profile from which the zipper is made at a point in the manufacturing process.

Referring now to FIG. 6, the profile 62, which comprises both the long web 20 and the short webs 22 shown in FIG. 1, passes through treater 66, which may be a corona discharge treater, as shown in FIG. 5. It will be observed that, in the cross section shown in FIG. 6, the profile 62 comprises plane areas 90 along its lateral edges, groove and rib members 92 and a central plane region 94. The lateral plane areas 90 are preferably treated by treating elements 96 to enable the adhesive used to form the peel seal to preferentially adhere thereto. Alternatively, the central plane region 94 may be so treated instead of the lateral plane areas 90.

The treater 66 is a surface modification instrument. Its purpose is to modify the surface of the lateral plane areas 90, so that the peel seal material may be retained on the treated surface when the resealable plastic zipper is first opened.

The treater 66 may apply a flame treatment to the surface of the lateral plane areas 90. The flame treatment will modify the surface so that the peel seal material, the adhesive, will adhere more firmly to the treated surface than it will to the untreated surface. As a consequence, when the resealable plastic zipper is first opened, the peel seal material will remain preferentially on the treated surface as opposed to the untreated surface.

Flame treating renders inert thermoplastics, such as polyolefins, receptive to other materials by bathing the surface in a highly oxidizing flame. This treatment oxidizes or modifies the surface layer making it particularly receptive to the peel seal material.

The treater 66, as noted above, may also be a corona discharge device. Corona discharge treatment is another method of rendering plastics, such as polyolefins, receptive to material such as peel seal material. A typical method is to pass the surface over a grounded metal cylinder above which is located a sharp-edged high voltage electrode spaced as to leave a small air gap between the plastic and electrode. The corona discharge oxidizes the sheet by means of the formation of polar groups on reactive sites making the surface receptive to the peel seal material.

Figure 7:
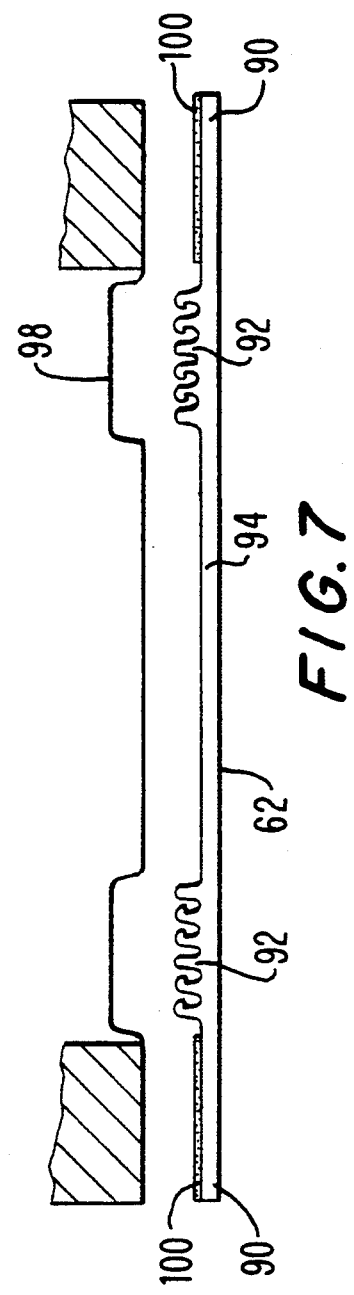
FIG. 7 is a cross section taken through the extruded profile at a subsequent point in the manufacturing process.

Referring now to FIG. 7, the profile 62 next passes through a coater 68, as shown in FIG. 5. In the cross section provided in FIG. 7, the profile 62 passes under a coating head 98, which may apply a coating of adhesive onto any preselected portion or portions of the width thereof. In the present case, it would do so onto those portions which have previously been treated, such as by corona discharge, in treater 66. The adhesive 100, accordingly, is shown on the two lateral plane areas 90 of the profile 62.

Figure 8:
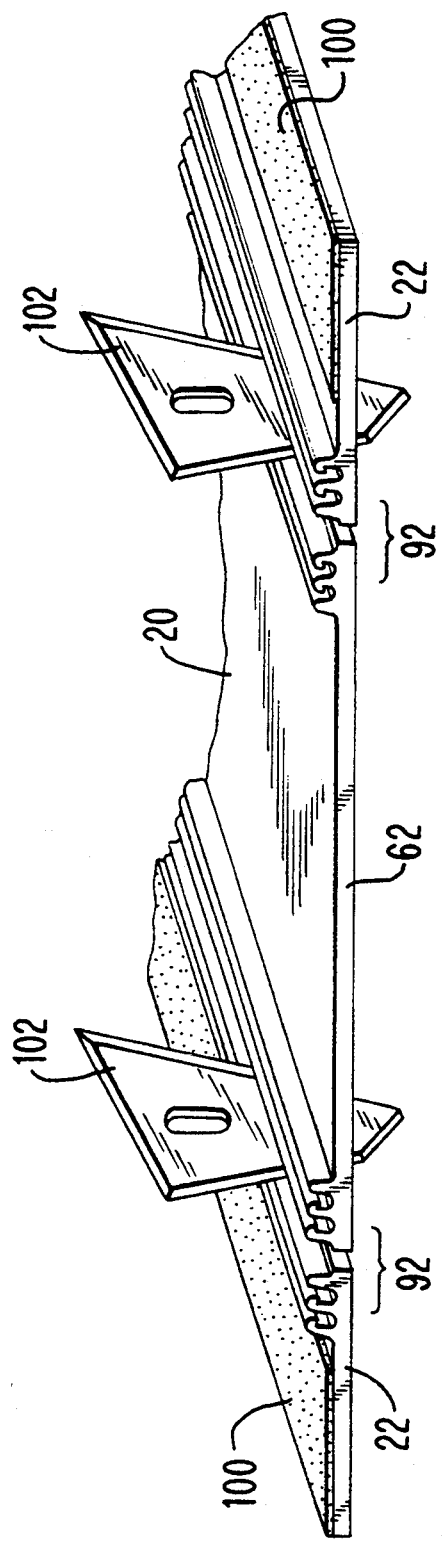
FIG. 8 depicts the extruded profile at a still later point in the manufacturing process.

FIG. 8 depicts what is done to the profile 62 as it passes through the slitter 72. At least one slitting blade 102 cuts the profile 62 longitudinally through the rib and groove members 92. It will be noted, by comparison with FIG. 1, that the profile 62 is thereby divided into a long web 20 and two short webs 22. In the preceding discussion of FIG. 5, these were referred to as components 74,76.

FIG. 9 shows the appearance of profile 62 upon its exit from the joiner 78. In the joiner 78, shown previously in FIG. 5, the two short webs 22, produced from the profile 62 by slitting blades 102, are folded over or inverted, and joined to the long web 20 by rib and groove members 92. The adhesive 100, as a consequence of this inversion, is disposed on those faces of the short webs 22 facing the long web 20.

FIG. 10 illustrates components of the joiner 78 which leave the profile 62 in the condition shown in FIG. 9. The long web 20 and short webs 22 are separated from one another as shown in FIG. 8, and the short webs 22 folded over as noted in the preceding paragraph. Separated from one another, they proceed, within the joiner, toward a merging wedge 102, which aligns rib and groove members 92 for subsequent engagement. Thus merged, the long web 20 and short webs 22 proceed through the nip 104 formed by a pair of pinch rolls 106, which force the rib and groove members 92 to interlock with one another as shown in FIG. 9. In such condition, the profile 62 may be wound onto spools 82 by winder 80 in FIG. 5 for subsequent use in the manufacture of plastic bags or packages.

When the peel seal is actually formed, the profile 62 as shown in FIG. 9 passes over or against heated sealing bars. The short webs 22 pass in contact with a first sealing bar, while the long web 20 passes in contact with a second sealing bar. The first and second sealing bars may force or squeeze the short webs 22 against the long web 20. Alternatively, rollers, downstream from the sealing bars, may be used for this purpose.

Short webs 22 may be heated to a higher temperature than long web 20 such as by setting the temperature of the first sealing bar to be higher than that of the second sealing bar. For example, the first sealing bar may be at a temperature of 360° F., while the second sealing bar may be at a temperature of 302° F. The application of a higher temperature to the side bearing the adhesive, in this case, the short webs 22, is important for achieving the consistency of the peel seal. As the hot peel seal material, or adhesive, cools, a hermetic seal bond is formed essentially bonding the short webs 22 to the long web 20. When the peel seal is first opened, this bond is broken and does not reseal.

Modifications to the above would be obvious to those skilled in the art, but would not bring the invention so modified beyond the scope of the appended claims.

What is claimed is:

1. A method for forming a tamper-evident, nonreclosable peel seal for a reclosable plastic bag, comprising the steps:

forming a first flexible plastic web having an interlockable rib and groove member and a side strip adjacent thereto;

forming a second flexible plastic web having an interlockable rib and groove member, said second flexible plastic web being interlockable with said first flexible plastic web, and a side strip adjacent thereto;

treating a surface of said side strip of said first flexible plastic web to enhance its receptiveness to an adhesive;

applying an adhesive to said treated strip;

pressing said side strips of said first and second flexible plastic webs together under heat, such that the temperature of said side strip of said first flexible plastic web is higher than the temperature of said side strip of said second flexible plastic web, said adhesive being between said side strips; and cooling said first and second flexible plastic webs to form a hermetic, tamper-evident nonreclosable peel seal between said side strips of said first and second flexible plastic webs.

2. A method as claimed in claim 1 wherein said step of pressing said side strips of said first and second flexible plastic webs together under heat comprises passing said side strip of said first flexible plastic web over a first sealing bar and passing said side strip of said second flexible plastic web over a second sealing bar, said first and second sealing bars being heated and pressing said side strips of said first and second flexible plastic webs together.

3. A method as claimed in claim 2 wherein said first sealing bar is at a temperature of 360° F., and said second sealing bar is at a temperature of 302° F.

4. A method as claimed in claim 1 wherein said step of treating a surface of said side strip of said first flexible plastic web to enhance its receptiveness to an adhesive is carried out using a flame treatment instrument.

5. A method as claimed in claim 1 wherein said step of treating a surface of said side strip of said first flexible plastic web to enhance its receptiveness to an adhesive is carried out using a corona discharge instrument.

6. A method as claimed in claim 1 further comprising the steps of:

providing a first ply and a second ply of plastic sheet material;

bonding said first ply of plastic sheet material to said first flexible plastic web; and bonding said second ply of plastic sheet material to said second flexible plastic web.

7. A method for manufacturing a reclosable zipper having a tamper-evident, nonreclosable peel seal for a reclosable plastic bag, comprising:
extruding a profile having interlockable rib and groove members and two plane areas from a synthetic polymeric material;
treating one of said two plane areas longitudinally along said profile to enhance the receptiveness of the surface thereof to an adhesive;
applying said adhesive to said treated plane area;
slitting said profile longitudinally to produce two interlockable sides of said zipper, one side having said treated plane area;
folding over one of said two sides of said zipper, so that said treated plane area having said adhesive faces the other of said two plane areas, and so that said rib and groove members may be interlocked with one another; and,
pressing said plane areas together under heat, such that the temperature of the treated plane area is higher than the temperature of the other plane area, said adhesive being between said plane areas, to form said peel seal.

8. A method as claimed in claim 7 further comprising the step of interlocking said rib and groove members with one another.

9. A method as claimed in claim 7 wherein said treating step is carried out using a flame treatment instrument.

10. A method as claimed in claim 7 wherein said treating step is carried out using a corona discharge instrument.

11. A method as claimed in claim 7 wherein said slitting step is performed longitudinally through said interlockable rib and groove members.

12. A method as claimed in claim 7 wherein said slitting step is performed longitudinally between said two plane areas.

13. A method as claimed in claim 7 further comprising the steps of:
providing a first ply and a second ply of plastic sheet material;
bonding said first ply of plastic sheet material to one of said two sides of said zipper; and
bonding said second ply of plastic sheet material to the other of said two sides of said zipper.

14. A method as claimed in claim 7 wherein said step of pressing said plane areas together under heat comprises passing said treated plane area over a first sealing bar and passing said other of said two plane areas over a second sealing bar, said first and second sealing bars being heated and pressing said plane areas together.

15. A method as claimed in claim 14 wherein said first sealing bar is at a temperature of 360° F., and said second sealing bar is at a temperature of 302° F.

16. A method for forming a tamper-evident, nonreclosable peel seal for a reclosable plastic bag, comprising the steps:
forming a first flexible plastic web having an interlockable rib and groove member and a side strip adjacent thereto;
forming a second flexible plastic web having an interlockable rib and groove member, said second flexible plastic web being interlockable with said first flexible plastic web, and a side strip adjacent thereto;
treating a surface of said side strip of said first flexible plastic web to cause an adhesive to preferentially adhere thereto, so that all of said adhesive may remain on said side strip when said peel seal is broken;
applying said adhesive to said surface of said side strip of said first flexible plastic web;
pressing said side strips of said first and second flexible plastic webs together under heat, such that the temperature of said side strip of said first flexible plastic web is higher than the temperature of said side strip of said second flexible plastic web, said adhesive being between said side strips; and
cooling said first and second flexible plastic webs to form a hermetic, tamper-evident nonreclosable peel seal between said side strips of said first and second flexible plastic webs.

17. A method as claimed in claim 16 wherein said step of pressing said side strips of said first and second flexible plastic webs together under heat comprises passing said side strip of said first flexible plastic web over a first sealing bar and passing said side strip of said second flexible plastic web over a second sealing bar, said first and second sealing bars being heated and pressing said side strips of said first and second flexible plastic webs together.

18. A method as claimed in claim 17 wherein said first sealing bar is at a temperature of 360° F., and said second sealing bar is at a temperature of 302° F.

19. A method as claimed in claim 16 further comprising the steps of:
providing a first ply and a second ply of plastic sheet material;
bonding said first ply of plastic sheet material to said first flexible plastic web; and
bonding said second ply of plastic sheet material to said second flexible plastic web.

20. A method for manufacturing a reclosable zipper having a tamper-evident, nonreclosable peel seal for a reclosable plastic bag, comprising:
extruding a profile having interlockable rib and groove members and two plane areas from a synthetic polymeric material;
treating one of said two plane areas to cause an adhesive to preferentially adhere thereto, so that all of said adhesive may remain on said one of said two plane areas when said seal is broken;
applying said adhesive to said one of said two plane areas longitudinally along said profile;
slitting said profile longitudinally to produce two interlockable sides of said zipper, one side having said adhesive;
folding over one of said two sides of said zipper, so that said treated plane area having said adhesive faces the other of said two plane areas, and so that said rib and groove members may be interlocked with one another; and,
pressing said plane areas together under heat, such that the temperature of the treated plane area is higher than the temperature of the other plane area, said adhesive being between said plane areas, to form said peel seal.

21. A method as claimed in claim 20 further comprising the step of interlocking said rib and groove members with one another.

22. A method as claimed in claim 20 wherein said slitting step is performed longitudinally through said interlockable rib and groove members.

23. A method as claimed in claim 20 wherein said slitting step is performed longitudinally between said two plane areas.

24. A method as claimed in claim 20 further comprising the steps of:
- providing a first ply and a second ply of plastic sheet material;
- bonding said first ply of plastic sheet material to one of said two sides of said zipper; and
- bonding said second ply of plastic sheet material to the other of said two sides of said zipper.

25. A method as claimed in claim 20 wherein said step of pressing said plane areas together under heat comprises passing said plane area having said adhesive over a first sealing bar and passing said other of said two plane areas over a second sealing bar, said first and second sealing bars being heated and pressing said plane areas together.

26. A method as claimed in claim 25 wherein said first sealing bar is at a temperature of 360° F., and said second sealing bar is at a temperature of 302° F.

* * * * *

UNITED STATES PATENT AND TRADEMARK OFFICE
CERTIFICATE OF CORRECTION

PATENT NO.   :   5,425,825
DATED        :   June 20, 1995
INVENTOR(S)  :   George Rasko and Lawrence Share It is certified that error appears in the above-indentified patent and that said Letters Patent is hereby corrected as shown below:

On the title page, item 73, Assignee insert:

MINIGRIP, INC.
    Orangeburg, New York

Signed and Sealed this

Thirty-first Day of October 1995

Attest:

BRUCE LEHMAN

*Attesting Officer*   *Commissioner of Patents and Trademarks*